United States Patent
Rowe et al.

(10) Patent No.: US 9,738,536 B2
(45) Date of Patent: *Aug. 22, 2017

(54) ALLOTROPE-SPECIFIC ANIONIC ELEMENT REAGENT COMPLEXES

(71) Applicants: Toyota Motor Engineering & Manufacturing North America, Inc., Erlanger, KY (US); The University of Manitoba, Winnipeg (CA)

(72) Inventors: Michael Paul Rowe, Pinckney, MI (US); Elizabeth Marie Skoropata, Winnipeg (CA); Johan Alexander van Lierop, Winnipeg (CA)

(73) Assignees: Toyota Motor Engineering & Manufacturing North America, Inc., Erlanger, KY (US); Univeristy of Manitoba, Winnipeg (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,303

(22) Filed: Jun. 8, 2016

(65) Prior Publication Data

US 2016/0280558 A1 Sep. 29, 2016

Related U.S. Application Data

(63) Continuation-in-part of application No. 14/506,373, filed on Oct. 3, 2014, now Pat. No. 9,384,878, which
(Continued)

(51) Int. Cl.
C01B 31/06 (2006.01)
C01B 31/04 (2006.01)
(Continued)

(52) U.S. Cl.
CPC .............. *C01B 35/02* (2013.01); *C01B 6/21* (2013.01); *C01B 31/04* (2013.01); *C01B 31/06* (2013.01); *H01F 1/0311* (2013.01); *H01F 3/00* (2013.01)

(58) Field of Classification Search
CPC  C01B 6/00; C01B 6/003; C01B 6/006; C01B 6/02; C01B 6/04; C01B 6/06; H01F 1/03611; H01F 3/00
(Continued)

(56) References Cited

U.S. PATENT DOCUMENTS 7,041,350 B1 * 5/2006 Rule ...................... C08G 63/88
428/221
7,785,392 B2    8/2010 Shim et al.
(Continued)

FOREIGN PATENT DOCUMENTS

JP        2006152376 A     6/2006
JP   WO 2012007830 A1 *   1/2012   ........... C01B 3/0042
(Continued)

OTHER PUBLICATIONS

Chen et al., "Improved Dehydrogenation Properties of Ca(BH4)2•nNH3 (n =1, 2, and 4) Combined with Mg(BH4)2", J. Phys. Chem., Sep. 2012, pp. 21162-21168, vol. 116.
(Continued)

*Primary Examiner* — Anthony J Zimmer
*Assistant Examiner* — Syed Iqbal
(74) *Attorney, Agent, or Firm* — Christopher G. Darrow; Darrow Mustafa PC (57) ABSTRACT

An allotrope-specific reagent includes a hydride molecule in complex with a specified elemental allotrope. The elemental allotrope included in the complex substantially retains a specified allotropic structure of the bulk element. For example, the reagent can contain a specified allotrope of
(Continued)

carbon, such as amorphous carbon, diamond, or graphite. The allotrope-specific reagent can be useful for the synthesis of allotropic nanoparticles. A method for synthesizing the allotrope-specific reagent includes a step of ball-milling a mixture that includes a bulk hydride molecule, such as lithium borohydride powder, and a powder of a specified elemental allotrope.

18 Claims, 6 Drawing Sheets

Related U.S. Application Data is a continuation-in-part of application No. 14/269,909, filed on May 5, 2014, now Pat. No. 9,260,312, and a continuation-in-part of application No. 14/269,895, filed on May 5, 2014, now Pat. No. 9,260,305, and a continuation-in-part of application No. 14/046,081, filed on Oct. 4, 2013, now Pat. No. 8,980,219.

(60) Provisional application No. 62/319,659, filed on Apr. 7, 2016.

(51) Int. Cl.
*C01B 35/02* (2006.01)
*C01B 6/21* (2006.01)
*H01F 1/03* (2006.01)
*H01F 3/00* (2006.01)

(58) Field of Classification Search
USPC ................................ 423/644; 241/26, 27
See application file for complete search history.

(56) References Cited

U.S. PATENT DOCUMENTS

| | | | |
|---|---|---|---|
| 8,192,866 B2 | 6/2012 | Golightly et al. | |
| 8,372,177 B1 | 2/2013 | Thoma et al. | |
| 8,395,003 B2 | 3/2013 | Leger et al. | |
| 8,980,219 B1 * | 3/2015 | Rowe | C01B 6/06 241/26 |
| 9,142,834 B2 | 9/2015 | Mohtadi et al. | |
| 9,216,910 B2 * | 12/2015 | Rowe | C01B 6/246 |
| 9,260,305 B2 * | 2/2016 | Rowe | C01B 6/246 |
| 9,260,312 B2 * | 2/2016 | Rowe | C01B 6/02 |
| 9,346,676 B2 * | 5/2016 | Rowe | C01B 6/246 |
| 9,384,878 B2 * | 7/2016 | Rowe | H01F 3/00 |
| 2005/0217427 A1 | 10/2005 | Suthersan et al. | |
| 2009/0029148 A1 | 1/2009 | Hashimoto et al. | |
| 2009/0090214 A1 | 4/2009 | Cheng | |
| 2009/0264277 A1 | 10/2009 | Raj et al. | |
| 2013/0084502 A1 | 4/2013 | Singh et al. | |
| 2015/0068646 A1 | 3/2015 | Rowe | |
| 2015/0096887 A1 | 4/2015 | McDonald et al. | |
| 2015/0097649 A1 | 4/2015 | Rowe | |
| 2015/0098882 A1 | 4/2015 | Rowe | |
| 2015/0098884 A1 | 4/2015 | Rowe | |
| 2015/0098885 A1 | 4/2015 | Rowe | |
| 2015/0098886 A1 | 4/2015 | Rowe et al. | |
| 2015/0098892 A1 | 4/2015 | Rowe et al. | |
| 2015/0099118 A1 | 4/2015 | Mizuno et al. | |
| 2015/0099135 A1 | 4/2015 | Mohtadi et al. | |
| 2015/0099172 A1 | 4/2015 | Rowe et al. | |
| 2015/0099182 A1 | 4/2015 | Singh et al. | |
| 2015/0099183 A1 | 4/2015 | Singh et al. | |
| 2016/0199916 A1 | 7/2016 | Rowe et al. | |
| 2016/0200753 A1 | 7/2016 | Rowe et al. | |

FOREIGN PATENT DOCUMENTS

| | | |
|---|---|---|
| JP | 2012038697 A | 2/2012 |
| JP | 2013073839 A | 4/2013 |
| JP | 2013131366 A | 7/2013 |
| WO | 2012007830 A1 | 1/2012 |
| WO | 2013056185 A1 | 4/2013 |
| WO | 2013063161 A2 | 5/2013 |

OTHER PUBLICATIONS

Imamura et al., "Dehydriding of Sn/MgH2 nanocomposite formed by ball milling of MgH2 with Sn", Int. J. Hydrogen Energy, Jul. 2007, pp. 4191-4194, vol. 32.

Schüth et al., "Light Metal Hydrides and Complex Hydrides for Hydrogen Storage", Chem Commun, Sep. 2004, pp. 2249-2258, Issue 20.

Varin et al., "The Effects of Ball Milling and Nonmetric Nickel Additive on the Hydrogen Desorption from Lithium Borohydride and Manganese Chloride (3LiBH4 + MnCl2) Mixture", 2010, Int. J. Hydrogen Energy, pp. 3588-3597, vol. 35.

Wronski et al., "A New Nanonickel Catalyst for Hydrogen Storage in Solid-state Magnesium Hydrides", 2011, Int. J. Hydrogen Energy, pp. 1159-1166, vol. 36.

* cited by examiner

ALLOTROPE-SPECIFIC ANIONIC ELEMENT REAGENT COMPLEXES

CROSS-REFERENCE TO RELATED APPLICATIONS

This application claims the benefit of U.S. Provisional Application No. 62/319,659, filed Apr. 7, 2016. This application is also a continuation-in-part of currently pending U.S. patent application Ser. No. 14/506,373, filed Oct. 3, 2014, which is a continuation-in-part of each of: U.S. patent application Ser. No. 14/269,909, filed May 5, 2014, now U.S. Pat. No. 9,260,312; and U.S. patent application Ser. No. 14/269,895, filed May 5, 2014, now U.S. Pat. No. 9,260,305, which is a continuation-in-part of U.S. patent application Ser. No. 14/046,081, filed Oct. 4, 2013, now U.S. Pat. No. 8,980,219. Each of the above-referenced patent applications is herein incorporated by reference in its entirety.

TECHNICAL FIELD

The present disclosure generally relates to a reagent having a specific allotrope of an allotropic element in complex with one or more hydride molecules and also to a method for synthesizing the reagent.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Nanoparticles of different allotropes of the same element can have significantly different properties and uses. For example, nanoparticles of diamond carbon, due to their hardness and chemical stability, may have uses as in vivo drug carriers, coatings, and a variety of other nanotechnological applications. Nanoparticles of graphitic or amorphous carbon may have electrochemical or photovoltaic applications. Similarly, metal nanoparticles having different microcrystalline forms can have substantially different properties.

Reagents having an element, formally in oxidation state zero, complexed with a hydride molecule have been termed AERCs (Anionic Element Reagent Complexes). AERCs show characteristics of anionicity of the elemental component, or a degree of sharing of electron density from the hydride component to the elemental component. AERCs are stable, and have been shown to have utility for the synthesis of a wide variety of elemental nanoparticles, including compositions of single or multiple elements of varying types (e.g. metal, non-metal, metalloid, etc.)

It would be desirable to further expand this technology to enable the synthesis of nanoparticles of different allotropes of a given element.

SUMMARY

Allotrope-specific reagents and their methods of production are provided.

In one aspect, an allotrope-specific reagent is provided. The allotrope specific reagent comprises a complex according to a formula, $Q^0 \cdot X_y$. $Q^0$ consists essentially of a single allotrope of an element, selected from among a plurality of available allotropes of the element, the element formally in oxidation-state zero. X is a hydride molecule, and y is an integral or fractional value greater than zero. In particular examples, $Q^0$ is an allotrope of carbon, such as amorphous carbon, diamond, or graphite. In some variations, the hydride molecule includes lithium borohydride.

In another aspect, a method for synthesizing an allotrope-specific reagent is disclosed. The method includes a step of ball-milling a mixture that includes: (i) a powder of an elemental allotrope, the elemental allotrope consisting essentially of a single allotrope of an element, selected from a plurality of available allotropes of the element and (ii) a hydride molecule in bulk form. Performance of the method results in formation of the complex according to the formula described above.

BRIEF DESCRIPTION OF THE DRAWINGS

Various aspects and advantages of the disclosure will become apparent and more readily appreciated from the following description of the embodiments taken in conjunction with the accompanying drawings, of which.

DETAILED DESCRIPTION

The reagents provided in the present disclosure belong to a group termed Anionic Element Reagent Complexes (AERCs). This type of reagent has been shown to have broad utility in the synthesis of elemental nanoparticles. The reagents of the present disclosure have particular utility in the synthesis of elemental nanoparticles having specific, desired allotropic structure. In particular, and in accordance with previously disclosed techniques, the present reagents are expected to yield elemental nanoparticles, with essentially no oxidation, of controllable size, and selectable inter-atomic structure. Methods for preparing the disclosed reagents are relatively easy and highly reproducible.

The disclosed reagents generally have an elemental component (i.e. an element formally in oxidation state zero) in complex with a molecular hydride. The elemental component will generally consist predominantly or entirely of a single allotropic form of the element employed. The complexation appears to result in a degree of electron density being shared by the molecular hydride with the elemental component. In particular, the elemental component will be derived from bulk element having a particular allotropic structure, and that allotropic structure is believed to be retained entirely or partially in the complex. Methods for producing disclosed reagents can include a step of ball-milling a mixture that includes a powder of a desired allotrope of an element and a hydride molecule.

Thus, an allotrope-specific reagent is disclosed, comprising a complex according to Formula I:

$$Q^0 \cdot X_y \qquad \qquad I,$$

wherein $Q^0$ consists essentially of a single allotrope of an element (also referred to herein as an "elemental allotrope"), selected from among a plurality of available allotropes of the element, the element formally in oxidation-state zero; wherein X is a hydride molecule; and wherein y is an integral or fractional value greater than zero. In different variations, the elemental allotrope, $Q^0$, can be a metal, a metalloid, or a non-metal. The specified allotrope of an element, $Q^0$, can at times also be referred to herein as "the elemental component" of the reagent.

The term "element", as used above and generally used herein, refers generally to elements of Groups 2-16, in particular those that have multiple allotropic forms and are solid under standard conditions of temperature and pressure such as 25° C. and 1 atmosphere pressure. The description that the element is formally in oxidation state zero indicates, at least, that it is in elemental form, having no formal positive or negative charge. It can also mean that the element is not covalently bonded to any other atoms or species.

The phrase "specified allotrope" indicates that the elemental component of the reagent is predominantly or entirely in a single allotropic form, i.e. consisting essentially of a single allotrope, with negligible presence of other allotropes of the element. This is particularly relevant in the case of elements known to alternatively exist in any one of a plurality of different allotropic structures, such as different unit cell crystalline structures, amorphous structures, laminar structures, etc.

For example, if the elemental component, $Q^0$, of the reagent includes carbon, it could be diamond, graphite, amorphous, or a less common carbon allotrope. If the elemental component, $Q^0$, of the reagent includes tin, it could, for example, be alpha tin, beta tin, gamma tin, or sigma tin. If the elemental component, $Q^0$, of the reagent includes a metalloid, it could be any one of a different number of allotropes potentially having very different metallic or non-metallic character, such as blue-white antimony (metalloid character) or yellow antimony (non-metallic character).

As used herein, the term "non-metal" can refer to any of carbon, phosphorous, sulfur, and selenium. The term "metalloid" can refer to any of boron, silicon, germanium, arsenic, antimony, tellurium, and polonium. The term "metal" can refer to any element, in particular any allotropic element, of Groups 2-15, exclusive of non-metals and metalloids. In some instances, the term "metal" can include any lanthanide, in particular any allotropic lanthanide.

The term "hydride molecule" can refer generally to any molecule capable of donating a hydride anion, including a salt hydride such as NaH or a complex hydride such as $LiAlH_4$. In some instances, a hydride molecule will refer in particular to a complex hydride, and in some instances will refer more particularly to a borohydride. In some specific examples, a hydride molecule can be lithium borohydride.

The value y according to Formula I defines the stoichiometry of hydride molecules to atoms of the elemental allotrope contained within the complex. The value of y can include any integral or fractional value greater than zero. In some instances, 1:1 stoichiometry wherein y equals 1 may be useful. In other instances, a molar excess of hydride molecule to elemental allotrope, for example where y equals 2 or 4, may be preferred. A molar excess of hydride to elemental allotrope can, in some instances, ensure that there is sufficient hydride present for subsequent applications.

The complexes of the present disclosure can have any supramolecular structure, or no supramolecular structure. Without being bound to any particular structure, and without limitation, the complex can exist as a supramolecular cluster of many atoms of elemental allotrope interspersed with hydride molecules. The reagent complex could exist as a cluster of atoms of elemental allotrope in which the cluster is surface-coated with hydride molecules. Any of these microscopic structures, or any other structure consistent with Formula I, is intended to be within the scope of the present disclosure.

The formation of AERCs is observable by x-ray photoelectron spectroscopy (XPS), among other techniques. It will be understood that the abbreviation, XPS, will also be used herein to refer to an x-ray photoelectron spectrum, or spectra. In particular, XPS of the elemental component of an AERC typically shows significant peak shifts and/or new peaks as compared to XPS of the bulk element. This phenomenon typically includes significant peaks shift to, and/or appearance of new peaks at, lower electron binding energies. Without being bound to any particular theory, it is believed that this may be indicative of electronic interaction between the relatively electron dense hydride molecule and the elemental component of the reagent. It is further believed that this interaction may result in a pseudo-anionic character of the elemental component, enabling it to aggregate into elemental nanoparticles during subsequent synthetic steps.

EXAMPLE 1-3

Formation of Allotrope-Specific Carbon AERCs

In three separate procedures, one part carbon powder (either amorphous carbon, diamond, or graphite), is combined with two parts lithium borohydride powder, producing a mixture, for Examples 1-3, respectively. The mixture is added to a stainless steel ball mill jar under argon, with steel balls. The AERC is then formed mechanochemically by milling in a planetary ball mill, at 150 to 400 rpms (this can vary, depending on hardness of powder of the allotropic element), for 4 hours.

Figure 1A:
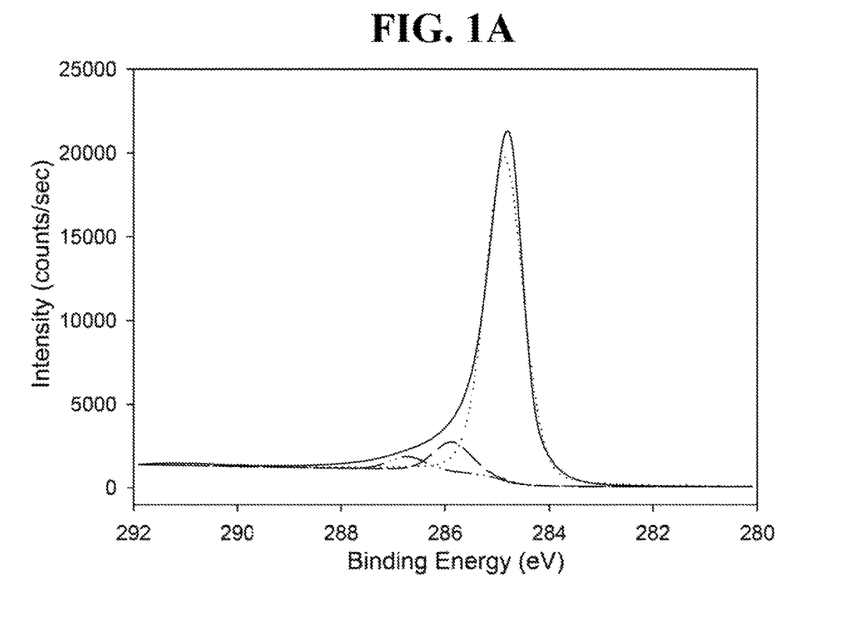
FIG. 1A is a carbon-region x-ray photoelectron spectrum (XPS) of bulk, amorphous carbon powder.

FIGS. 1A-3D show various XPS of bulk allotropes of carbon and of reagents according to Formula I, in which $Q^0$ is a specified allotrope of carbon. In all of FIGS. 1A-3D, the solid line, generally having the highest intensity values, represents acquired data, while the various dashed and dotted lines, generally having lower intensity values and each having a single Gaussian peak, show computationally deconvoluted component peaks. FIGS. 1A, 2A, and 3A show XPS of three different carbon allotropes. FIGS. 1B-1D, 2B-D, and 3B-3D show XPS of the corresponding three allotropic carbon AERCs each of which has the same generic formula $C \cdot (LiBH_4)_2$.

Figure 1B:
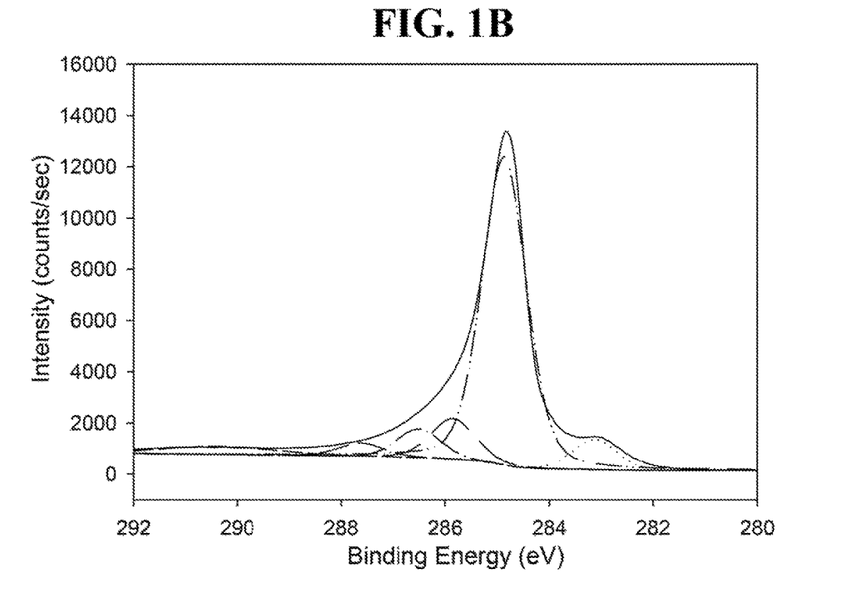
FIG. 1B is a carbon-region XPS of a reagent of the present disclosure having amorphous carbon in complex with lithium borohydride.
Figure 1C:
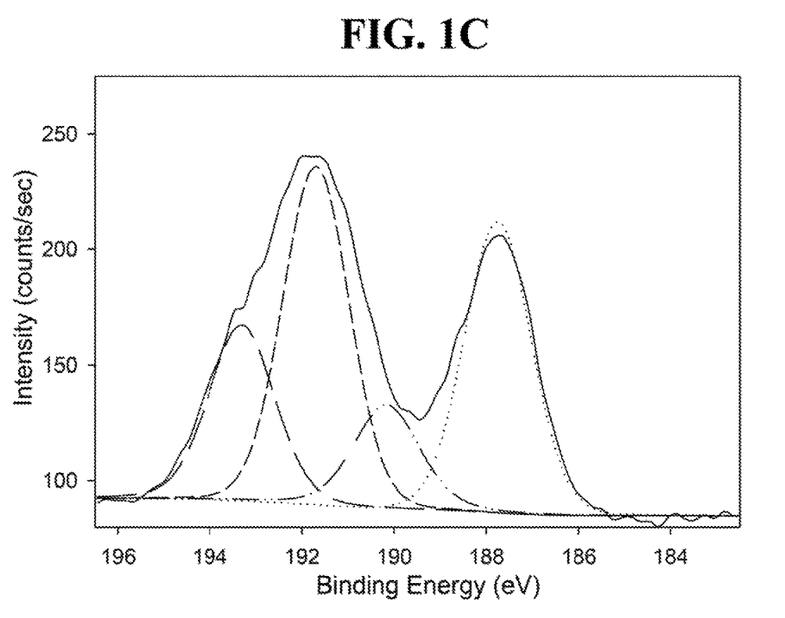
FIG. 1C is a boron-region XPS of the reagent of FIG. 1B.
Figure 1D:
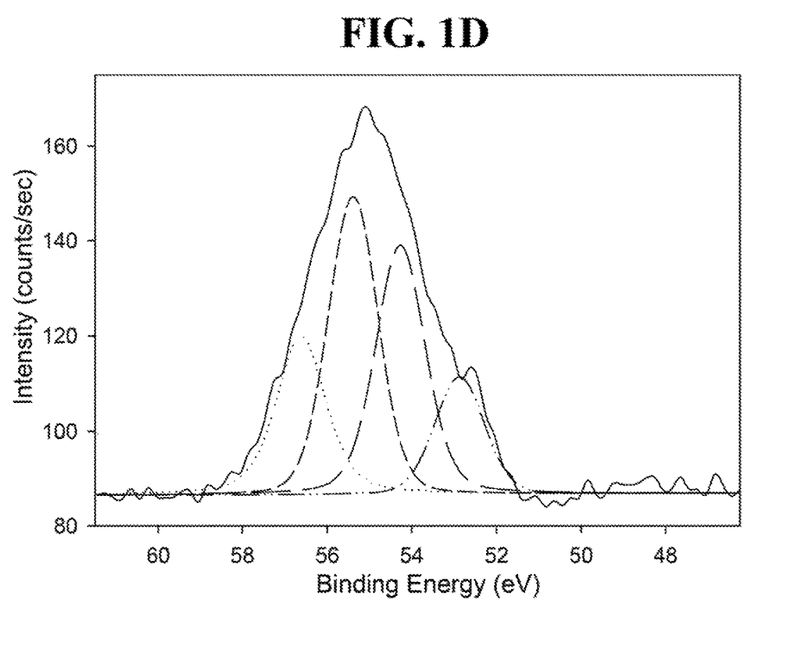
FIG. 1D is a lithium-region XPS of the reagent of FIG. 1B.

Referring now to FIGS. 1A-1D, FIG. 1A shows an XPS of amorphous carbon powder, while FIGS. 1B-1D show XPS in the carbon, boron, and lithium regions, respectively, of a reagent according to Formula I in which $Q^0$ is amorphous carbon. In particular, a comparison of FIGS. 1A and 1B indicates formation of the amorphous carbon AERC, by the presence of the relatively low binding energy peak in FIG. 1B at 283.1 eV, as well as other differences.

Figure 2A:
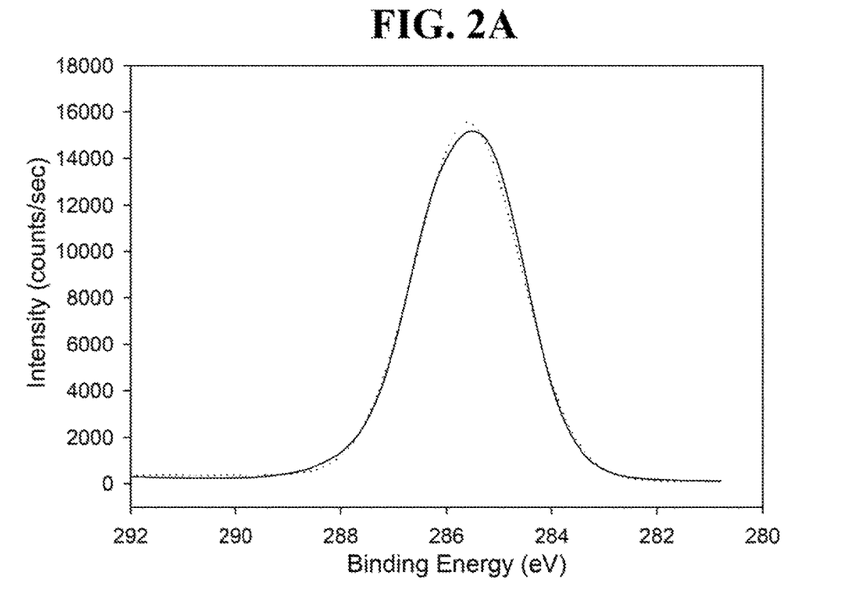
FIG. 2A is a carbon-region x-ray photoelectron spectrum (XPS) of bulk, diamond powder.
Figure 2B:
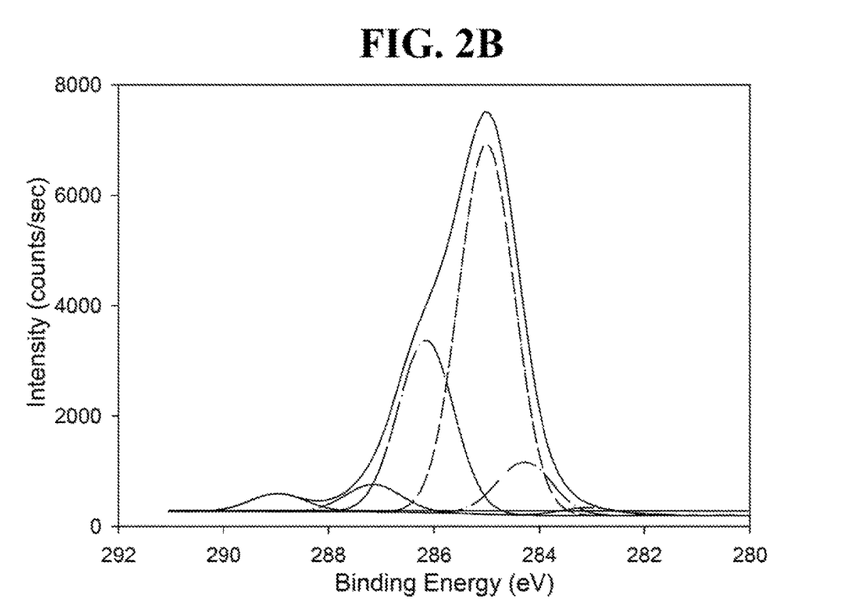
FIG. 2B is a carbon-region XPS of a reagent of the present disclosure having diamond carbon in complex with lithium borohydride.
Figure 2C:
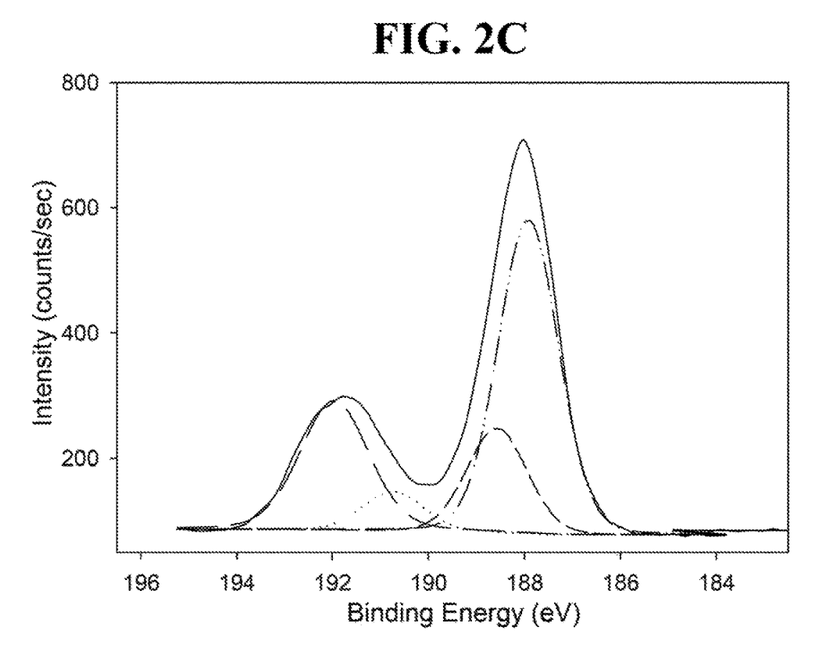
FIG. 2C is a boron-region XPS of the reagent of FIG. 2B.
Figure 2D:
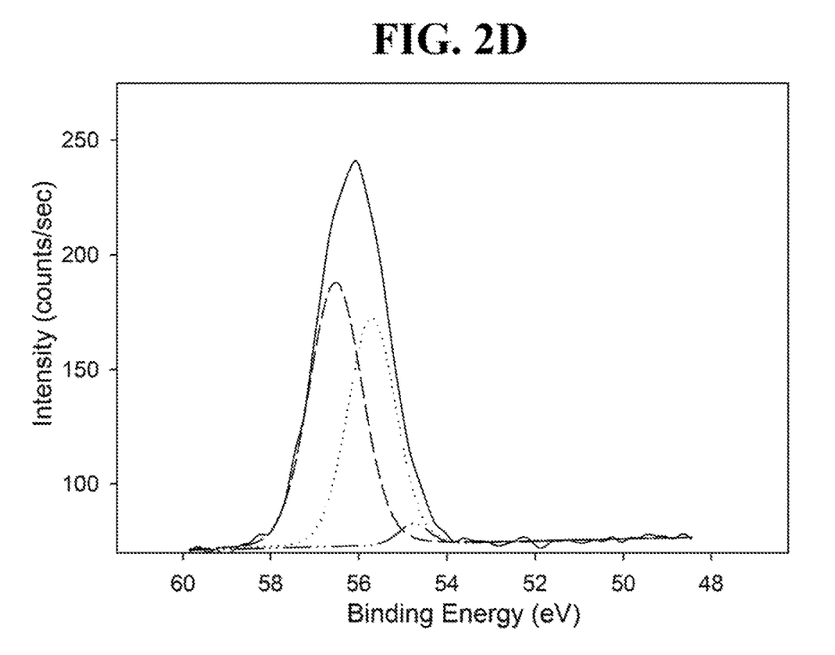
FIG. 2D is a lithium-region XPS of the reagent of FIG. 2B.

Referring now to FIGS. 2A-2D, FIG. 2A shows an XPS of diamond powder, while FIGS. 2B-2D show XPS in the carbon, boron, and lithium regions, respectively, of a reagent according to Formula I in which $Q^0$ is diamond carbon. A comparison of FIGS. 2A and 2B indicates formation of the diamond AERC, by multiple shifts and/or new peaks. In particular, the single 285.6 eV peak of bulk diamond powder is split into multiple peaks in the complex, with major components at lower binding energy (from 0.6 to 2.5 eV lower) but also with significant components at higher binding energy.

Figure 3A:
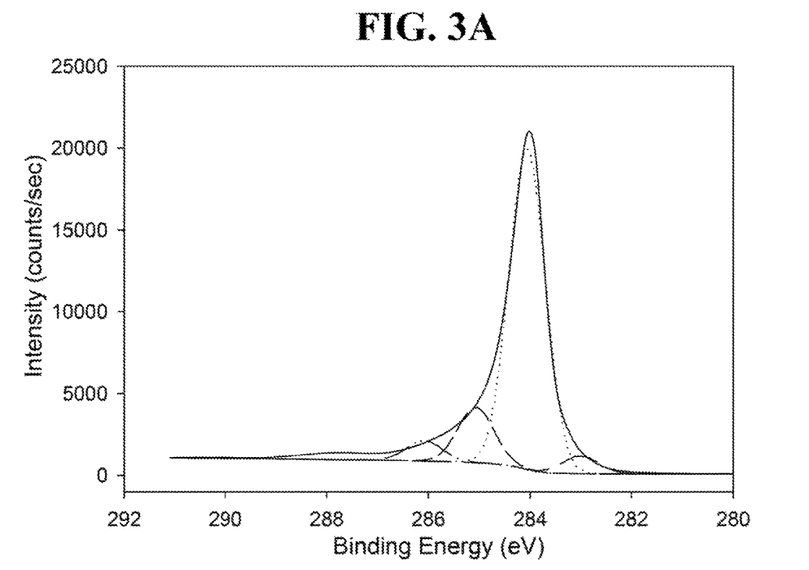
FIG. 3A is a carbon-region x-ray photoelectron spectrum (XPS) of bulk, graphite powder.
Figure 3B:
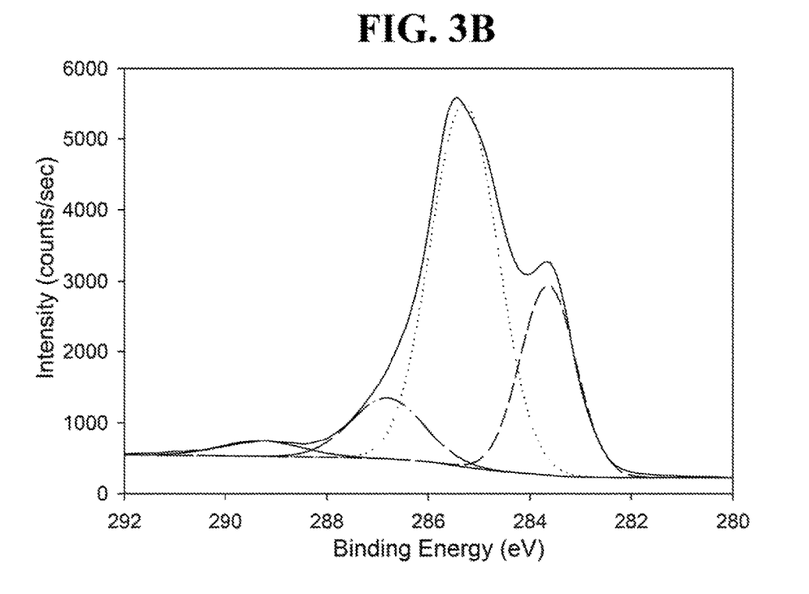
FIG. 3B is a carbon-region XPS of a reagent of the present disclosure having graphitic carbon in complex with lithium borohydride.
Figure 3C:
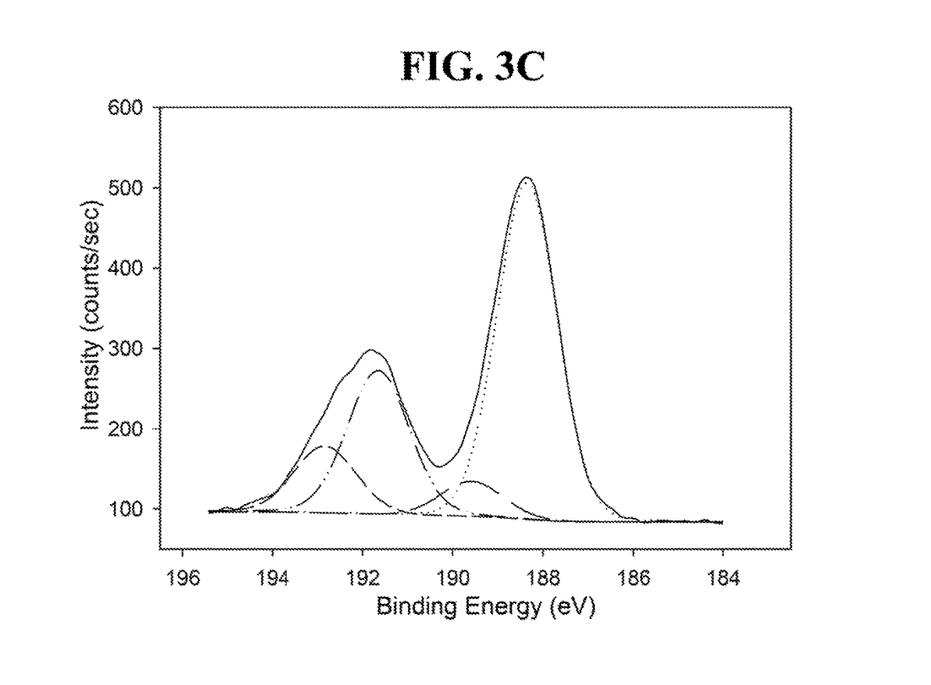
FIG. 3C is a boron-region XPS of the reagent of FIG. 3B.
Figure 3D:
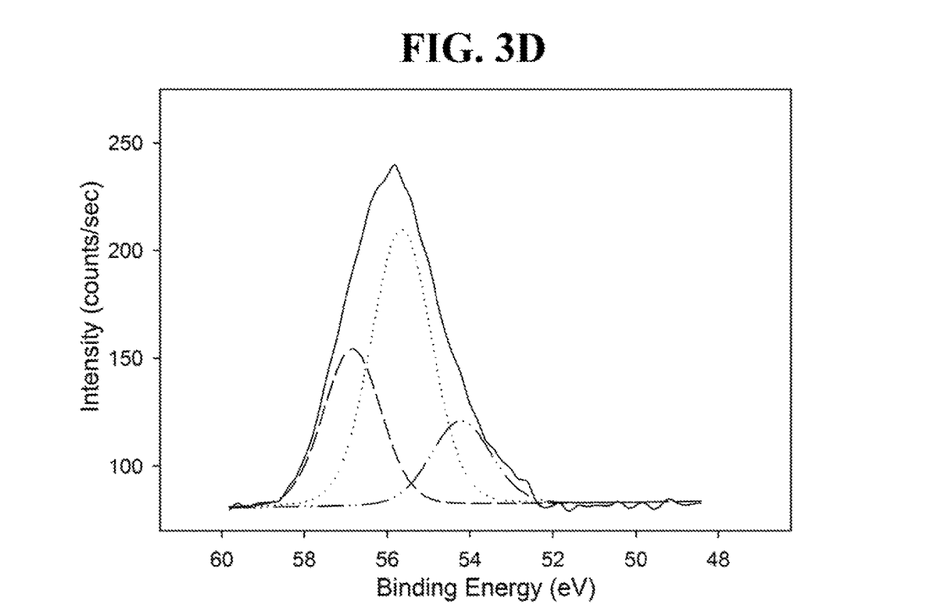
FIG. 3D is a lithium-region XPS of the reagent of FIG. 3B.

Referring now to FIGS. 3A-3D, FIG. 3A shows an XPS of graphite powder, while FIGS. 3B-3D show XPS in the carbon, boron, and lithium regions, respectively, of a reagent according to Formula I in which $Q^0$ is graphitic carbon. A comparison of FIGS. 3A and 3B indicates formation of the graphite AERC, by multiple shifts and/or new peaks. In particular, while bulk graphite has a dominant peak centered at 284.1 eV, the graphite AERC has a major peak at 1.2 eV higher binding energy and a substantial peak at 0.5 eV lower binding energy than the dominant bulk graphite peak. Smaller, but significant peaks are present at substantially higher binding energy in the graphite AERC as compared to the highest energy shoulder peaks in the bulk graphite.

With reference to FIGS. 1A, 2A, and 3A, it is to be noted that the carbon allotropes in bulk form are easily distinguishable from one another by XPS. Similarly, and with reference to FIGS. 2A, 2B, and 2C, the carbon region XPS of the amorphous carbon, diamond, and graphite AERCs are all easily distinguishable from one another. From this, it is plausible to infer that the inter-atomic allotropic structure of the elemental carbon component is substantially retained in the complex.

With further reference to FIGS. 1C, 2C, and 3C, collectively, and separately to FIGS. 1D, 2D, and 3D, collectively, it is further of interest to note that the lithium region and boron region XPS of the allotropic AERCs are easily distinguishable from one another. For example, the boron region XPS of amorphous carbon AERC (FIG. 1C) and diamond AERC (FIG. 2C) are dramatically different from one another. This observation is consistent with a view that the electronic structure of all components of the AERC (i.e. the elemental component and all portions of the hydride molecule) are affected by complex formation, and thus that the AERC structure involves substantial interaction between the elemental component and the hydride molecule. In addition, this observation supports the conclusion that the specific inter-atomic allotropic structure of the bulk element is substantially retained in the allotropic AERC. Given the significant differences in electron binding energy at lithium, for example, between amorphous carbon AERC and diamond AERC, it can be surmised that the electronic structure at lithium is sensitive to the allotropic structure of the elemental component of the AERC.

Also disclosed is a method for synthesizing an allotropic-specific reagent. The method includes a step of ball-milling a mixture that includes: (i) a powder of an elemental allotrope, the elemental allotrope consisting essentially of a single allotrope of an element, selected from a plurality of available allotropes of the element, and (ii) a hydride molecule. The term "hydride molecule" generally has the same meaning as described above in reference to Formula I, although in relation to the ball-milling step of the present method, it generally refers to a bulk form of the hydride molecule.

The phrase "powder of an elemental allotrope" refers generally to a "specified allotrope", as that term is used above, albeit in bulk, powder form. Thus, the powder of an elemental allotrope should generally consist substantially or entirely of the specified allotrope. It is to be understood that the word "powder" refers not only to a bulk material that is already powdered (i.e. a flowable small particulate bulk material) but also to any structural composite, such as a compacted aggregate, that is easily physically reducible to powder, for example, by ball-milling. All other terms relating to the method are as defined above, including the types of elements, which are formally in oxidation-state zero, from which the powder of an elemental allotrope can be selected. Thus, for example, the powder of an elemental allotrope can be a powder of a metal allotrope, a powder of a metalloid allotrope, or a powder of a non-metal allotrope, as the terms metal, metalloid, and non-metal are defined above. In particular examples, the powder of an elemental allotrope can be amorphous carbon powder (e.g. "carbon black"), diamond powder, or graphite powder.

The ball-milling step of the present method will generally produce a complex according to Formula I, as described above, and the specified allotrope as present in the complex will generally correspond to the specified allotrope as present in the powder of an elemental allotrope. The mixture that is ball-milled in the ball-milling step can include any non-zero molar ratio hydride molecules to atoms of the elemental allotrope contained in the powder of the elemental allotrope. It will be understood that the value y in Formula I for the complex produced by the ball-milling step will generally reflect this stoichiometric ratio, as an integral or fractional value greater than zero. For example, if the mixture to be ball-milled includes two equivalents of hydride molecule and one equivalent of atoms of the elemental allotrope, then the value y, according to Formula I, for the resulting complex will be two.

While the complex produced by the ball-milling step is in many instances stable under a wide variety of conditions, it may be desirable in some circumstances to perform the ball-milling step under an inert atmosphere.

The present disclosure is further illustrated with respect to the following examples. It needs to be understood that these examples are provided to illustrate specific embodiments of the present disclosure and should not be construed as limiting the scope of the present disclosure.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An allotrope-specific reagent comprising a complex according to a formula:

$$Q^0 \cdot X_y,$$

wherein $Q^0$ consists essentially of a single allotrope of an element, selected from among a plurality of available allotropes of the element, the element formally in oxidation-state zero; wherein X is a hydride molecule; and wherein y is an integral or fractional value greater than zero.

2. The reagent complex as recited in claim 1, wherein $Q^0$ is a specified allotrope of a metal.

3. The reagent complex as recited in claim 1, wherein $Q^0$ is a specified allotrope of a metalloid.

4. The reagent complex as recited in claim 1, wherein $Q^0$ is a specified allotrope of a non-metal.

5. The reagent complex as recited in claim 4, wherein $Q^0$ is a specified allotrope of carbon.

6. The reagent complex as recited in claim 5, wherein $Q^0$ is amorphous carbon.

7. The reagent complex as recited in claim 5, wherein $Q^0$ is diamond.

8. The reagent complex as recited in claim 5, wherein $Q^0$ is graphite.

9. The reagent complex of claim 1, wherein the hydride molecule comprises lithium borohydride.

10. A method for synthesizing an allotrope-specific reagent, the method comprising:
    ball-milling a mixture that includes:
        a powder of an elemental allotrope, the elemental allotrope consisting essentially of a single allotrope of an element, selected from a plurality of available allotropes of the element; and
        a hydride molecule in bulk form, present at a molar ratio relative to the powder of the elemental allotrope;
    wherein ball-milling produces a complex according to a formula:

$$Q^0 \cdot X_y,$$

wherein $Q^0$ is the elemental allotrope, X is the hydride molecule, and y expresses the molar ratio as an integral or fractional value greater than zero.

11. The method as recited in claim 10, wherein the powder is a powder of a metal allotrope.

12. The method as recited in claim 10, wherein the powder is a powder of a metalloid allotrope.

13. The method as recited in claim 10, wherein the powder is a powder of a non-metal allotrope.

14. The method as recited in claim 13, wherein the powder is a powder of a carbon allotrope.

15. The method as recited in claim 14, wherein the powder is amorphous carbon powder.

16. The method as recited in claim 14, wherein the powder is diamond powder.

17. The method as recited in claim 14, wherein the powder is graphite powder.

18. The method as recited in claim 10, wherein the hydride molecule comprises lithium borohydride.

* * * * *

UNITED STATES PATENT AND TRADEMARK OFFICE
CERTIFICATE OF CORRECTION

PATENT NO. : 9,738,536 B2
APPLICATION NO. : 15/176303
DATED : August 22, 2017
INVENTOR(S) : Michael Paul Rowe et al.

It is certified that error appears in the above-identified patent and that said Letters Patent is hereby corrected as shown below:

In the Specification

In Column 1, Line No. 67, "$Q^0 . X_y$" should be "$Q^0 \bullet X_y$"
In Column 3, Line No. 14, "$Q^0 . X_y$" should be "$Q^0 \bullet X_y$"

In the Claims

In Column 7, Line No. 37, "$Q^0 . X_y$" should be "$Q^0 \bullet X_y$"
In Column 8, Line No. 27, "$Q^0 . X_y$" should be "$Q^0 \bullet X_y$"

Signed and Sealed this
Seventh Day of November, 2017

Joseph Matal
*Performing the Functions and Duties of the*
*Under Secretary of Commerce for Intellectual Property and*
*Director of the United States Patent and Trademark Office*